Figure 1:
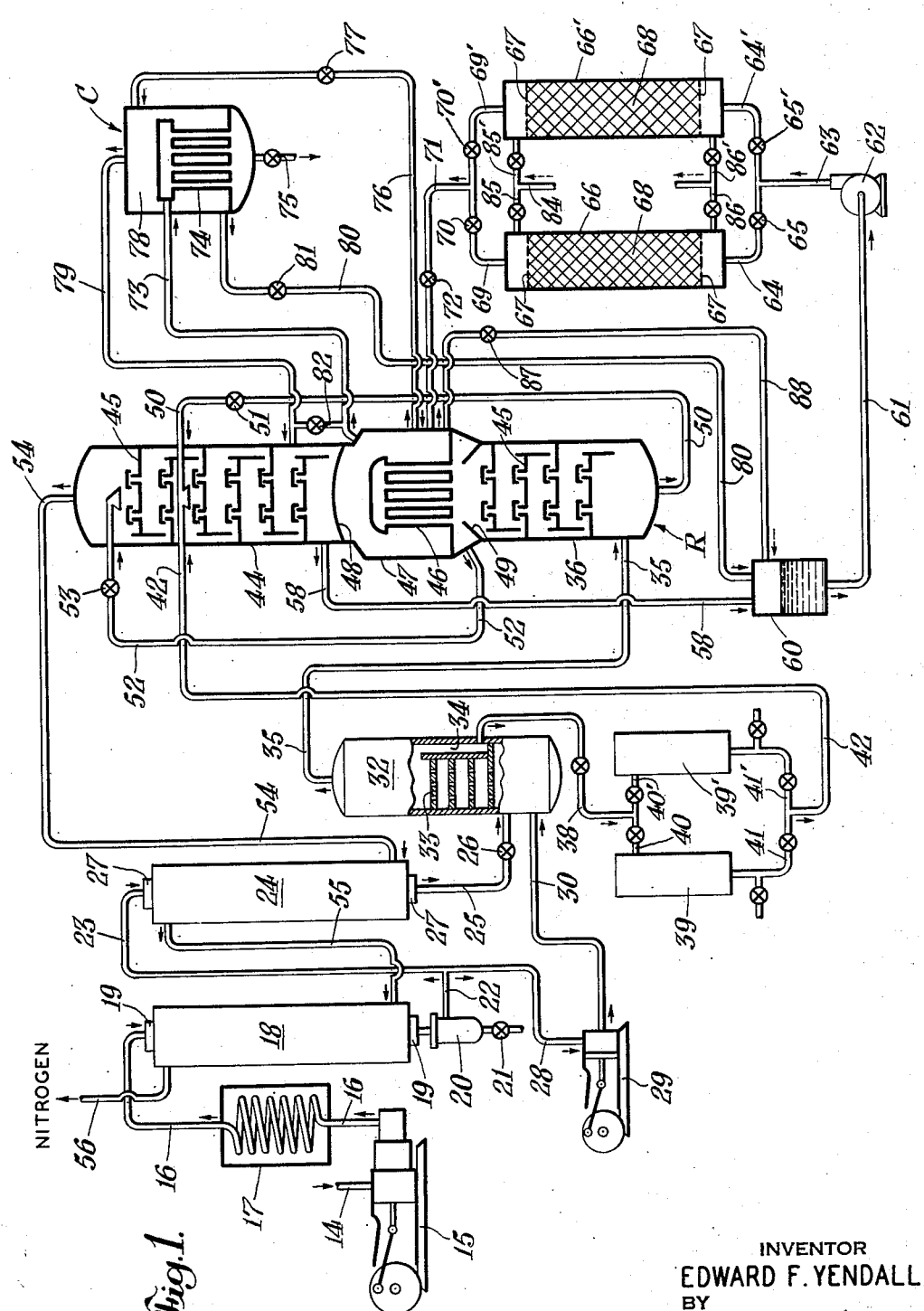

Oct. 28, 1952  E. F. YENDALL  2,615,312
PROCESS AND APPARATUS FOR ELIMINATING IMPURITIES
DURING THE SEPARATION OF GAS MIXTURES
Filed May 7, 1949  2 SHEETS—SHEET 1

INVENTOR
EDWARD F. YENDALL
BY
D.C. Harrison
ATTORNEY

INVENTOR
EDWARD F. YENDALL
BY
D.C. Harrison
ATTORNEY

Patented Oct. 28, 1952

2,615,312

UNITED STATES PATENT OFFICE 2,615,312

PROCESS AND APPARATUS FOR ELIMINATING IMPURITIES DURING THE SEPARATION OF GAS MIXTURES

Edward F. Yendall, Kenmore, N. Y., assignor, by mesne assignments, to Union Carbide and Carbon Corporation, a corporation of New York Application May 7, 1949, Serial No. 91,982

10 Claims. (Cl. 62—122)

This invention relates to the separation of components of gas mixtures and more especially it concerns a process and apparatus for eliminating higher boiling point impurities such as carbon dioxide, hydrocarbons, et cetera, during the separation of gas mixtures such as air by low temperature rectification.

Heretofore, in the separation of air by low temperature rectification processes, difficulties normally have arisen as a result of the presence in the air of hydrocarbons and other impurities which tend to accumulate and become concentrated in portions of the rectification apparatus, and particularly in those portions of the apparatus where the oxygen is produced and isolated, at which points the presence of hydrocarbons constitutes a serious industrial hazard.

Various attempts have been made to minimize these hydrocarbon accumulations by separating such impurities from an intermediate crude liquid oxygen product, for example, by filtering the liquid being transferred from a higher pressure stage to a lower pressure stage of rectification. Another procedure involves the use of an auxiliary condenser having a condensing head disposed within a vaporizing chamber, and having a condensate chamber at its lower end. The impurity-free vapors produced in the vaporizing chamber of the auxiliary condenser flow from the top of the latter to an intermediate part of a low pressure rectifying column. Periodically or continuously the accumulated hydrocarbons and other solid impurities are withdrawn from the auxiliary condenser through a suitable drain connection and discarded with a substantial amount of the valuable liquid. Nevertheless, the heat-exchange surfaces of the auxiliary condenser gradually collect carbon dioxide, hydrocarbons, and other solid impurities to an extent such that the heat transfer efficiency of the auxiliary condenser eventually is seriously impaired. Many impurities have substantial solubility in liquid air and oxygen so that filtration methods cannot be completely effective. Furthermore, the concentration of such impurities sometimes has resulted in these impurities being carried over in the vapors flowing to the rectifying column.

Among the more important objects of this invention are the following: to provide a novel process and apparatus for preventing or retarding the undue accumulation of hydrocarbons and other impurities in elements of a gas separation plant wherein concentration or rectification of components of gas mixtures is being conducted at low temperatures; to provide in novel manner for eliminating or reducing the loss in production capacity caused by the use in the usual manner of an auxiliary condenser in conjunction with rectifying apparatus; and to provide for accumulating hydrocarbons and other impurities within a zone external to and remote from the rectifying apparatus and auxiliary condenser, so as to minimize the damage and loss of production capacity in the event of flashing of such impurities in the presence of high purity oxygen.

In the practice of a preferred modification of the invention for the separation of air, the latter is compressed and cooled in the usual manner while under pressure to a low temperature. A portion of the cooled air is liquefied upon expansion to a lower pressure. All of the cooled air preferably is then thoroughly scrubbed with liquefied portions of the air at a lower pressure. The solid impurities are retained by the liquid fraction, and the substantially impurity-free gaseous fraction may be passed directly to the lower portion of a high pressure zone of a two-stage rectifying column. The liquid fraction of the air, which contains the solid impurities, may be filtered by passing it through one of a pair of duplicate filters. The solid carbon dioxide and hydrocarbons collect on the filters. The filtered liquid fraction then may be passed directly into a low pressure rectifying zone or column. The aforesaid scrubbing of the air and the filtration of the liquid fraction of the scrubbed air may be dispensed with if desired, the cooled and partly liquefied air being then passed directly into a rectifying column.

The accumulation of hydrocarbons including acetylene on a filter in liquid oxygen does not avoid completely the well-known hazard of hydrocarbon-oxygen mixtures. It has been discovered that the adsorption of hydrocarbons including acetylene in the fine pores of a adsorbent material that is inert to oxygen such as silica gel, alumina gel, or other mineral adsorbents is not hazardous but that the gel after it has adsorbed a considerable amount of these hydrocarbons and despite the presence of pure oxygen is not sensitive to flashing.

It is a distinguishing and important feature of the invention that a residual liquid rich in oxygen is withdrawn from a zone where liquid oxygen is collected and concentrated, is forced through a hydrocarbon removing device including a body of mineral adsorbent material and the cleaned liquid is passed to a vaporizing zone. A considerable amount of the dangerous impurities may be safely retained by the adsorbent before it is necessary to renew the adsorbent which is conveniently done by warming and evacuating or by purging with a relatively warm clean gas. According to another embodiment of the invention, a liquid intermediate product rich in oxygen is withdrawn from the lower portion of the rectification column or zone in which the main rectification occurs and is conducted to a storage reservoir from whence it is forced through an adsorbent device, or one of a pair of such devices, by means of a suitable pump, thereby removing any impurities present in the liquid as a result of the evaporation of portions of the liquid. The resultant high-purity liquid oxygen then is forced under pressure into the vaporizing chamber of a main condenser which conveniently may be operated at around 6 to 8 pounds per square inch above the pressure existing in the rectifying column. In the said vaporizing chamber the liquid is evaporated by heat exchange with condensing gases of lower oxygen content from a rectifying column or a chamber operating under a higher pressure. The resultant oxygen vapors, free from impurities, are conducted to the condenser tubes of an auxiliary condenser, and there are condensed by heat exchange with a colder fluid, preferably liquid oxygen withdrawn from the main condenser and being vaporized under a pressure about equal to the pressure of the low pressure rectifying column or zone with which the vaporizing chamber of the auxiliary condenser is in communication.

Thus it will be understood that the pressure initiated at the pump is employed to facilitate operation of the auxiliary condenser evaporating compartment under a pressure approximately that of the low pressure rectifying column, while the main condenser high purity oxygen evaporating compartment may be operated at somewhat higher pressures made possible by use of the pump.

Figure 2:
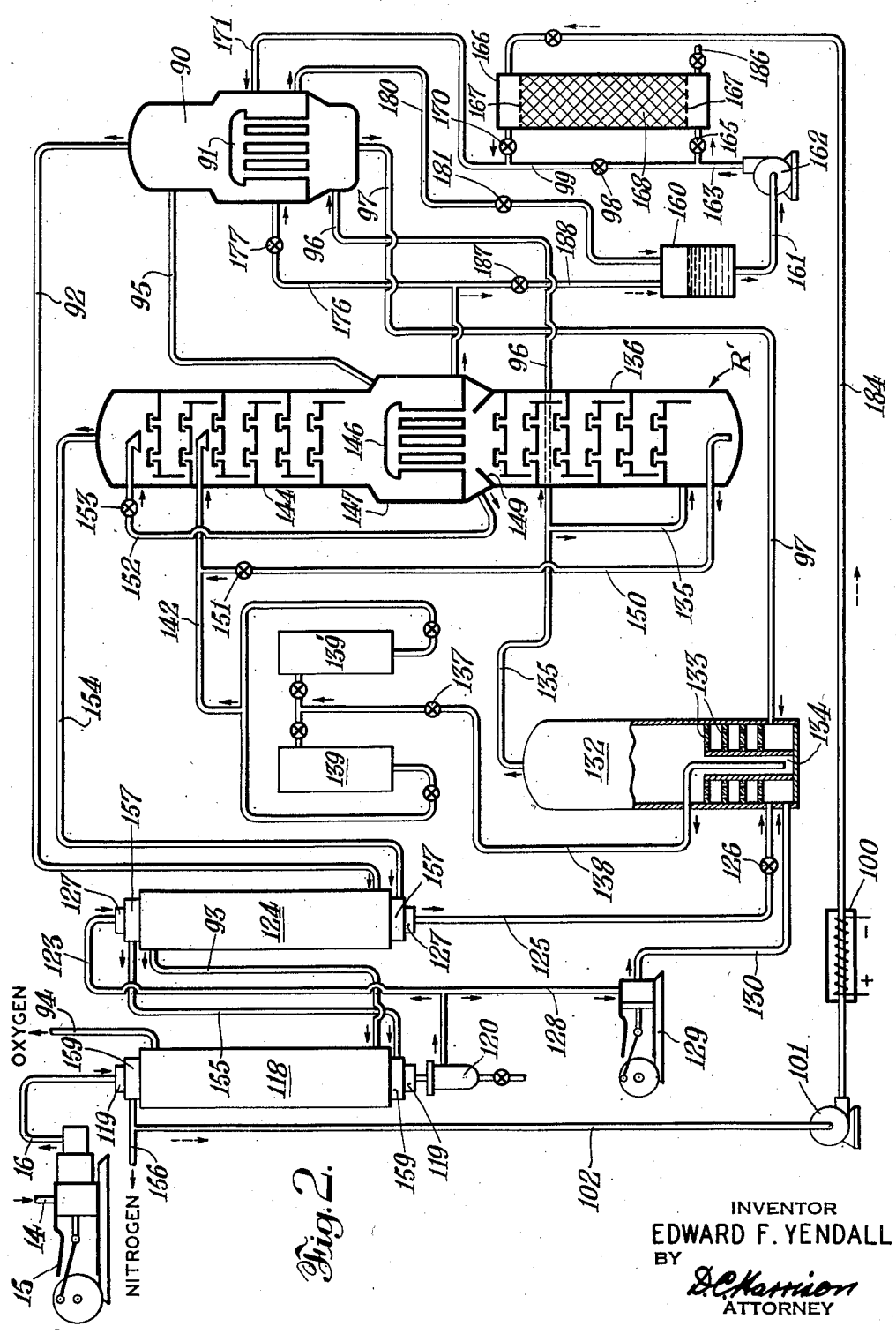

The above-mentioned objects and features of the invention and other objects and advantages will become apparent from the following description in connection with the accompanying drawings, in which:

Fig. 1 is a diagrammatic view of an assemblage of apparatus embodying the principles of the invention in a system for producing liquid oxygen from air; and Fig. 2 is a similar view of apparatus embodying principles of the invention in a system for producing gaseous oxygen.

For air separation by low temperature rectification, various cycles for the refrigeration and partial liquefaction of the air can be employed; and any of the customary procedures may be used for drying the air. However, in the modification shown in Fig. 1, the air entering the unit may preferably be washed with water or cleaned by other customary means. The air then passes through conduit 14 into the low pressure cylinder of a multi-stage air compressor 15 wherein the air is compressed to a high pressure which may be as much as 2000 pounds per square inch. The compressed air leaves the compressor through pipe 16 having therein an after cooler 17, and passes through the high pressure tube bundle 19 of a heat exchanger 18. The lower ends of the high pressure tubes communicate with a trap 20 which collects condensed water. The exchanger 18 may be so operated that the air is cooled to a temperature near but not below 0° C. to avoid the freezing of water. Water may be periodically blown from trap 20 through valve 21. The air leaves the trap 20 through conduit 22 having branch lines 23 and 28. Conduit 23 conducts a large portion of the air to the upper tube header 27 of a main countercurrent heat exchanger 24. A conduit 25 having therein an expansion valve 26 conducts the cold air containing particles of solid carbon dioxide and the hydrocarbons and other impurities from heat exchanger 24 into the lower portion of a scrubber-separator 32. Expansion valve 26 may be used to reduce the pressure of the air to that of scrubber 32 which may, for example, be substantially that existing in the high pressure stage of rectification or somewhat higher. A portion of the air expanded through valve 26 is liquid at the pressure of scrubber 32.

Preferably a substantial portion of the air leaving the trap 20 through line 22 is conducted through branch line 28 to an expansion engine 29 wherein the air is expanded to the pressure of the scrubber 32 and, due to the production of external work, the temperature of the air is reduced to a very low value. The expanded air is then conducted to the scrubber 32 through conduit 30.

The scrubber 32 is provided with gas and liquid contact means, which preferably comprise a series of perforated plates disposed above the inlet conduits 25 and 30 and extending upward for a short portion of the scrubber, leaving a large vapor space above the plates to prevent loss of liquid by entrainment in the gases. An overflow chamber 34 maintains the liquid level slightly above the upper plate 33. The gaseous fraction leaves the scrubber through conduit 35 and flows to the lower portion of a relatively high pressure chamber 36 of a rectifying column R, which chamber may function under a pressure of around 100 pounds per square inch.

The liquid fraction containing solid carbon dioxide and hydrocarbon impurities in solid and dissolved state is conducted from the scrubber 32 through conduit 38 to one of a pair of filters 39, 39'. These filters conveniently may be similar to the filters 42, 43, described in United States Patent No. 2,337,474 of H. C. Kornemann and E. F. Yendall. Conduit 38 has two valve-controlled branches 40, 40' connecting it with the filters. The filtered liquid leaves the filters through the valved branch lines 41 and 41' and the main conduit 42 which conducts the filtered liquid to a mid-portion of a relatively low pressure chamber 44 of the rectifying column R, which chamber may function under a pressure around 6 to 8 pounds per square inch.

The rectifying column R, in the form shown, comprises a lower rectifying column 36 and an upper rectifying column 44, each having customary gas and liquid contact trays 45. A main condenser 46 is located in a chamber 47 intermediate the upper and lower rectifying columns. The chamber 47 and upper column 44 are not in direct unrestricted communication, being separated by a solid diaphragm such as the plate 48. The upper end of column 36 communicates with the interior of the tubes of condenser 46; and the former has a liquid collecting shelf 49 disposed immediately below the condenser. The oxygen evaporation chamber 47 surrounding condenser 46 may function under a pressure around 15 pounds per square inch.

Crude oxygen-containing liquid collecting at the lower end of column 36 is transferred by a conduit 50 controlled by a valve 51 to an intermediate portion of the upper column 44. Liquid high in nitrogen collects at the shelf 49 and is transferred to the upper end of column 44 through conduit 52 controlled by a valve 53, to provide a further reflux liquid for that column.

The nitrogen product of the separation flows from the top of the upper column 44 through a conduit 54 to the lower end of main heat exchanger 24, and thence through the latter in countercurrent indirect heat exchange relation with the high pressure air in the exchanger tubes. The nitrogen leaves exchanger 24 through conduit 55 which conducts it to the lower end of heat exchanger 18. The nitrogen leaves the latter through conduit 56.

Except for the arrangement of the condenser chamber 47, the apparatus thus far described is similar to that disclosed in the aforesaid Patent No. 2,337,474.

The impurity-containing oxygen-rich liquid collecting in the lower portion of the upper rectifying column 44 is withdrawn through conduit 58 and conducted to a reservoir 60 for the liquid. The lower portion of the reservoir 60 is connected through conduit 61 with the inlet of a liquid oxygen pump 62, which may be similar to that described in United States Patent No. 2,340,787 of G. H. Zenner and E. F. Yendall. The pump 62 forces the liquid through conduit 63 and branches 64, 64', controlled by valves 65, 65', into and through one of a pair of impurity removing devices 66, 66'. The devices 66 and 66' may comprise tanks or chambers having transverse screens 67 near each end with the space between the screens packed with granular adsorbent 68. The adsorbent material is preferably a mineral gel having selective adsorbent capacity for the impurities. Silica and alumina gels have been found preferable and safe.

From the devices 66, 66', the cleaned liquid oxygen, now free from solid and dissolved impurities, is passed through a corresponding conduit 69, 69', controlled by one of the valves 70, 70', and through line 71, controlled by valve 72, into the lower portion of chamber 47. A portion of the cleaned oxygen is there vaporized, and is conducted through conduit 73 to the heat exchanger tubes 74 of an auxiliary condenser C, where it is condensed and the high purity liquid oxygen product withdrawn from the system through valve-controlled conduit 75.

The residual liquid oxygen is continously withdrawn from chamber 47 and conducted through conduit 76, controlled by valve 77, to the vaporizing compartment 78 of the auxiliary condenser C, where it is vaporized by heat exchange with the oxygen being condensed in condenser tubes 74. The vapors from compartment 78 flow through conduit 79 to the lower portion of column 44. Any residual unvaporized liquid, which will retain any residual hydrocarbons and/or other impurities, may be conducted from the lower part of compartment 78, either continuously or intermittently, through a conduit 80, controlled by valve 81, to the reservoir 60, and thence recirculated to one of the devices 66, 66'.

Portions of the oxygen vapors formed in the evaporating chamber 47 are conducted through a valve-controlled conduit 82 connecting portions of conduits 73 and 79, into the lower end of the rectifying column 44.

Either device 66 or 66' may be purged of adsorbed impurities and any solid state impurities also retained, when desired, by closing valves 65, 70, or 65', 70', and passing dry effluent nitrogen which may have been previously heated, through a conduit 84 and one of respective valved branches 85, 85', into the corresponding device 66. The nitrogen and gasified impurities leave through a corresponding valved waste conduit 86 or 86'. Thus, if it is desired to thaw and regenerate the adsorbent in the device 66, valves 65 and 70 are closed, and valves 65', 70', 85 and 86 are opened. A stream of warm dry nitrogen then flows from conduit 84 to the interior of the device 66, through the adsorbent material 68 and then out through line 86. Substantially all of the impurities collected in the adsorbent are released and blown out. When the device 66' has been in service for a determined period, it may be regenerated in a similar manner.

By the use of the pump 62, and the proper adjustment of the valves 75, 77, 82, 51, and 53, the evaporating chamber 47 may be operated at a pressure around 6 to 8 p. s. i. above the pressure in the upper column 44. Thus, oxygen is vaporized under pressure in chamber 47, and later is condensed in condenser 74, refrigeration for the purpose being supplied by the boiling of oxygen entering chamber 78 through conduit 76 and under the lower pressure of the column 44.

By regulation of a valve 87 in a drain conduit 88 from the bottom of chamber 47 to reservoir 60, any selected portion of the liquid passing through the devices 66, 66' may be recycled to insure that the liquid oxygen level in chamber 47 shall be maintained at the proper level for most efficient heat transfer across condenser 46.

In certain instances it may be desirable to effect a preliminary removal of a large portion of the carbon dioxide of the air to be processed by chemical treatment of the air prior to or during compression and, in such instances, the scrubber-separator 32 and filters 39 and 39' may be omitted or by-passed by connecting conduits 25 and 30 directly to the lower column 36. No liquid fraction then flows to the upper chamber 44 but all the oxygen containing liquid collected in the high pressure chamber 36 is transferred to the upper chamber 44, for rectification therein, by conduit 50 and expansion valve 51.

The modification of Fig. 2 illustrates the principles of the invention as applied in a plant more specifically designed for the production of gaseous oxygen. As in Fig. 1, the apparatus for preparing the incoming air for entry into the rectification column is merely exemplary of the various types of such apparatus. In Fig. 2, air entering at 14 to a compressor 15 is conducted after compression through conduit 16 to a high pressure heat exchanger tube bundle 119 of a heat exchanger 118. The cooled air then passes through a trap 120 for the removal of moisture and then is divided into two streams, one of which flows through branch conduit 123 to the relatively warm end header 127 in a second main countercurrent heat exchanger 124.

A conduit 125 conducts the compressed air which has been cooled to condensation temperature into the lower end of a scrubber separator 132. The conduit 125 has interposed therein an expansion valve 126. The other portion of compressed air flows through conduit 128 to an expansion engine 129 and the portion of air that is expanded with the production of external work is conducted from the engine through a conduit 130 to the lower part of the scrubber 132. The scrubber contains perforated plates 133 and an overflow cup 134 to maintain a liquid level just above the plates 133 so that the air is adequately scrubbed by liquid air as it passes to the upper part of the scrubber chamber 132. From the scrubber chamber a conduit 135 conducts the scrubbed air to the lower or high pressure chamber 136 of a two-stage rectifying column R'.

A liquid overflowing into the cup 134, which contains solid carbon dioxide particles and some particles of hydrocarbon impurities, is conducted by a conduit 138 controlled by an expansion valve 137 to one of a pair of filters 139, 139'. From the filters a conduit 142 conducts the filtered scrubber liquid to an intermediate point of an upper column 144 of the rectifying apparatus R'.

The rectifying apparatus R' comprises the high pressure chamber 136 and the upper low pressure rectifying chamber 144, which has at its lower end a vaporizing chamber 147, the chambers being separated by a main condenser 146 disposed in the chamber 147. The main condenser receives vapor internally of its tubes from the chamber 136 and such vapor is condensed to form reflux for the chamber 136, so that a liquid enriched in oxygen is collected at the bottom of the chamber 136. Such liquid is transferred through a conduit 150 controlled by a transfer valve 151 to an intermediate point of the upper chamber 144, for example, by joining conduit 142.

An annular shelf 149 is arranged at the upper end of the chamber 136 to catch some of the liquid condensed by the condenser 146, which liquid is very rich in nitrogen and is conducted by a conduit 152 to the upper end of the chamber 144 to provide reflux for the upper end of the low pressure chamber. This is regulated by a transfer valve 153 in the conduit 152. The effluent nitrogen vapor of the chamber 144 is conducted by a conduit 154 to a nitrogen passage 157 of heat exchanger 124 and from the warm end of which a conduit 155 conducts the nitrogen to a nitrogen passage 159 in heat exchanger 118, from the warm end of which a conduit 156 conducts the product nitrogen away.

The oxygen product collects in liquid state in the chamber 147 and is boiled by condenser 146 to provide vapor for the rectifying chamber 144. A large part of the concentrated product oxygen flows in liquid form through a conduit 176 having a control valve 177 into an auxiliary vaporizing chamber 90 to be substantially completely vaporized therein by a heat exchange coil or condenser 91 disposed in the lower part of the chamber 90. The oxygen product vapors withdrawn from the top of the chamber 90 pass through a conduit 92 to a jacket passage of heat exchanger 124 and from heat exchanger 124 through a conduit 93 to heat exchanger 118, and from the latter heat exchanger through a conduit 94 to a place of use or collecting receiver for the product oxygen. It will be preferable to provide a vapor phase connection 95 between the chambers 147 and 90 to equalize pressure and permit flow of oxygen vapor in either direction according to the relative evaporation rates effected by condenser 146 and the heat exchange coil or condenser 91. The heat exchange coil or condenser 91 is preferably heated by condensing a vapor for a useful purpose. To this end a portion of the cold scrubbed air is conducted by a branch 96 of conduit 135 to the condenser 91 and liquid air produced by the condenser 91 is conducted from the bottom thereof by a conduit 97 to the scrubber 132 in order to insure that the scrubber 132 has sufficient scrubber liquid. This addition of scrubber liquid is advantageous in a plant producing warm gaseous oxygen, because the amount of refrigeration required is ordinarily insufficient to create enough liquid air upon expansion of the air through the expansion valve 126. The impurities that become concentrated in the liquid oxygen due to the evaporation effected in chambers 147 and 90 are kept to a very low state of concentration by withdrawal of liquid from the lower part of the chamber 90 through a conduit 180 controlled by a valve 181. Such liquid may be collected in a vessel 160, from whence the liquid to be recirculated is conducted by conduit 161 to a pump 162, which forces out through a connection 163 to the lower end of an adsorbent chamber 166 that contains an adsorbent material 168 retained between perforated plates or screens 167. The cleaned recirculating liquid is returned to the chamber 90 from the upper end of the chamber 166 through a conduit 171. Since it may be desirable to draw the liquid directly from the chamber 147, a conduit 188 has been provided which connects to the conduit 176 and is controlled by a valve 187 to conduct the liquid into the reservoir 160. If the reservoir 160 and the liquid space of the chamber 90 are made of sufficient size, it may be advantageous to employ only one adsorbing device 166 instead of duplicate adsorbers, as in Fig. 1, and when the adsorbing device 166 is to be regenerated, valves 165 and 170 at the inlet and outlet thereof are closed and a valve 98 in a conduit 99 connecting conduits 163 and 171 may be opened and the liquid continued in circulation so that for a limited period of time the concentration of impurities in the circulating liquid will not exceed a dangerous upper limit. For regenerating the adsorbent in chamber 166 there is provided a connection 184 at the upper end which receives warmed nitrogen from a heater 100 that in turn is supplied with dry nitrogen by a blower 101 connected to draw dry nitrogen from the conduit 156 by a conduit 102. A nitrogen which is blown through the adsorbent material 168 is exhausted to the atmosphere through the lower connection 186.

When liquid oxygen is flowed directly from chamber 147 to chamber 90 through conduit 176 it will be preferable to have the chambers at about the same level or the chamber 90 may be at a lower level. Where it is more convenient to have the chamber 90 higher than chamber 147 it will be preferable to keep valve 177 closed and pass all the liquid oxygen that is to be vaporized in chamber 90 through conduit 188 under control of valve 187 and force it by pump 162 through adsorber 166 to chamber 90.

While solid particles of impurities will be trapped and retained in the devices 66 and 166, it may be advisable, especially in instances where the scrubber 32 or 132 and filters 39 and 139 are not used, to provide filters in addition to the adsorbers in the recirculating stream. Thus filters similar to the filters 39 may be interposed in the conduits 61 or 63 or 161 or 163. Such filters will serve to increase the time between regenerations of the adsorbent materials.

It will be seen therefore that the improved impurity separating arrangement according to the invention may be applied to various types of gas separation plants to avoid accumulation of undesirable amounts of impurities in the rectifying apparatus and to prevent such impurities from appearing in the desired product of the separation. Such result is accomplished whether or not a preliminary separation of the impurities is practiced prior to rectification, or whether or not the rectification is effected in a single stage or in two stages. Any impurities that may reach the final rectification chamber are eliminated by filtering and adsorption to such a degree that accumulation of impurities on boiling surfaces is prevented and the vapor pressure of impurities other than those which are too volatile to cause trouble, is kept so low that no measurable amount remains in the product oxygen.

The invention has been specifically described in connection with the separation of the components of air to produce oxygen and nitrogen. However, the principles thereof are not limited to such use, but are applicable to the low temperature separation of other gas mixtures containing carbon dioxide and/or hydrocarbons such, for example, as coke oven gases.

Obviously various modifications may be made without departing from the spirit of the invention as herein described and claimed.

What is claimed is:

1. A process for limiting the accumulation of hydrocarbon impurities in an oxygen-rich product in a system for low temperature separation of air that includes a zone in which said product is collected and partially vaporized, which process comprises withdrawing liquid oxygen product from said zone; forcing such withdrawn liquid into intimate contact with an adsorbent material that is inert to oxygen and selectively retains hydrocarbon impurities including acetylene in a flash-safe manner; passing the withdrawn cleaned liquid to a separate vaporizing zone and subjecting it to vaporization therein; and recirculating a portion of the liquid from said separate vaporizing zone through said adsorbent material and back to said separate vaporizing zone.

2. In a process for eliminating impurities during the separation of air by low temperature rectification which includes the steps of separating compressed cooled air into a substantially impurity-free vapor fraction that is rectified under a condensation pressure, and a liquid fraction containing impurities partly in solidified state and partly in solution, which liquid fraction is filtered to remove solidified impurities and rectified under a relatively low pressure, and a portion of the liquid oxygen product in the latter rectification is subjected to partial vaporization to provide vapor for said rectification, the improvement which comprises subjecting the liquid oxygen product to a separate vaporizing operation that forms a residual liquid in which the dissolved impurities tend to concentrate; recycling a portion of such residual liquid from the vaporizing operation through an impurity-removal operation including an adsorbent medium which removes hydrocarbons including acetylene in a flash-safe manner, and returning the cleaned liquid to said vaporizing operation.

3. Apparatus for eliminating impurities during the separation of air by low temperature rectification which comprises an air rectifying device including high and low pressure column chambers and an oxygen vaporizing chamber with a condenser therein in heat exchange relation to vapors of said high pressure column, and means for transferring crude oxygen containing hydrocarbon impurities from the high pressure column chamber to the low pressure column chamber; means for withdrawing liquid oxygen containing impurities from said low pressure chamber; an auxiliary vaporizing chamber connected to receive the withdrawn liquid; means for withdrawing liquid from said auxiliary chamber; means for returning cleaned liquid to said auxiliary chamber; and recirculating means including a liquid oxygen pump and a chamber containing an adsorbent material operatively connected between said withdrawing means and said returning means.

4. Apparatus for eliminating impurities during the separation of air by low temperature rectification which comprises an air rectifying device including high and low pressure column chambers and an oxygen vaporizing chamber with a condenser therein in heat exchange relation to vapors of said high pressure column, and means for transferring crude oxygen containing hydrocarbon impurities from the high pressure column chamber to the low pressure column chamber; means for withdrawing liquid oxygen containing impurities from said low pressure chamber; an auxiliary vaporizing chamber; means for returning cleaned liquid to said auxiliary chamber; and circulating means including a liquid oxygen pump and a chamber containing an adsorbent material operatively connected between said withdrawing means and said returning means.

5. Apparatus according to claim 4 which includes means for draining a portion of liquid from said auxiliary vaporizing chamber to the inlet side of said pump.

6. Apparatus for eliminating impurities during the separation of air by low temperature rectification which comprises an air rectifying device including high and low pressure column chambers and an oxygen vaporizing chamber with a condenser therein in heat exchange relation to vapors of said high pressure column, and means for transferring crude oxygen containing hydrocarbon impurities from the high pressure column chamber to the low pressure column chamber; means for withdrawing liquid oxygen containing impurities from said low pressure chamber; an auxiliary vaporizer connected to receive liquid from said oxygen vaporizing chamber; a liquid circuit including a liquid oxygen pump and a chamber of adsorbent material; means for drawing liquid from said auxiliary chamber to said liquid circuit; and means for delivering cleaned liquid from said circuit to said auxiliary vaporizer.

7. Apparatus according to claim 6 which includes means for heating the auxiliary vaporizer by condensing a portion of cold incoming air.

8. Apparatus according to claim 6 which includes means for draining liquid from the oxygen vaporizing chamber to said liquid circuit.

9. Apparatus for eliminating impurities during the separation of air by low temperature rectification which comprises an air rectifying device including high and low pressure column chambers and an oxygen vaporizing chamber with a condenser therein in heat exchange relation to vapors of said high pressure chamber, and means for transferring crude oxygen containing hydrocarbon impurities from the high pressure chamber to the low pressure column chamber; means for withdrawing liquid oxygen containing impurities from said low pressure chamber; an auxiliary vaporizing chamber connected to receive the withdrawn liquid; means for withdrawing liquid from said auxiliary chamber; means for returning cleaned liquid to said auxiliary chamber; a chamber containing an adsorbent material; and means operatively connected for effecting circulation of liquid oxygen from said withdrawal means, through said adsorbent material to said returning means.

10. In a process for eliminating impurities during the separation of air by low temperature rectification which includes the steps of cleaning compressed and cooled air by scrubbing it with a liquid fraction of the air, rectifying the cleaned air to produce an oxygen enriched product which is subjected to partial vaporization to provide vapor for the rectification, the improvement comprising subjecting the oxygen product to a separate vaporizing operation that forms a residual liquid in which residual impurities tend to concentrate; recycling a portion of such residual liquid from the vaporizing operation through an impurity-removal operation including an adsorbent medium which removes hydrocarbons including acetylene in a flash-safe manner, and returning the cleaned liquid to said vaporizing operation.

EDWARD F. YENDALL.

REFERENCES CITED

The following references are of record in the file of this patent:

UNITED STATES PATENTS

| Number | Name | Date |
|---|---|---|
| 1,891,125 | Gessel | Dec. 13, 1932 |
| 2,256,421 | Borchardt | Sept. 16, 1941 |
| 2,337,474 | Kornemann et al. | Dec. 21, 1943 |
| 2,464,891 | Rice | Mar. 22, 1949 |
| 2,500,136 | Ogorzaly | Mar. 7, 1950 |
| 2,502,250 | Dennis | Mar. 28, 1950 |
| 2,514,921 | Yendall | July 11, 1950 |

FOREIGN PATENTS

| Number | Country | Date |
|---|---|---|
| 413,518 | Great Britain | July 19, 1934 |